United States Patent
Senneff et al.

(10) Patent No.: US 8,209,075 B2
(45) Date of Patent: Jun. 26, 2012

(54) METHOD AND SYSTEM FOR GENERATING END TURNS

(75) Inventors: Aaron Matthew Senneff, Ankeny, IA (US); Brandon G. Leiran, Grimes, IA (US); Timothy J. Roszhart, Urbandale, IA (US)

(73) Assignee: Deere & Company, Moline, IL (US)

( * ) Notice: Subject to any disclaimer, the term of this patent is extended or adjusted under 35 U.S.C. 154(b) by 941 days.

(21) Appl. No.: 12/164,897

(22) Filed: Jun. 30, 2008

(65) Prior Publication Data

US 2009/0037041 A1    Feb. 5, 2009

Related U.S. Application Data

(60) Provisional application No. 60/962,643, filed on Jul. 31, 2007.

(51) Int. Cl.
*G01C 22/00* (2006.01)
*G05D 1/00* (2006.01)

(52) U.S. Cl. ............... 701/23; 701/26; 701/50; 701/400; 701/408; 701/410; 701/411; 701/412; 701/416; 701/468

(58) Field of Classification Search ............ 701/23, 701/26, 50, 200, 201, 207, 209, 213, 400, 701/408, 410, 411, 412, 416, 468
See application file for complete search history.

(56) References Cited

U.S. PATENT DOCUMENTS

| | | | |
|---|---|---|---|
| 3,468,379 A | 9/1969 | Rushing et al. | |
| 3,606,933 A | 9/1971 | Rushing et al. | |
| 4,515,221 A | 5/1985 | Van Der Lely | |
| 4,518,044 A | 5/1985 | Wiegardt et al. | |
| 4,600,999 A * | 7/1986 | Ito et al. | 701/25 |
| 4,626,993 A | 12/1986 | Okuyama et al. | |
| 5,543,802 A | 8/1996 | Villevieille et al. | |
| 5,558,163 A | 9/1996 | Hollstein | |
| 5,606,850 A | 3/1997 | Nakamura | |
| 5,704,546 A | 1/1998 | Henderson et al. | |
| 5,862,509 A * | 1/1999 | Desai et al. | 701/411 |
| 5,899,950 A | 5/1999 | Milender et al. | |
| 5,961,573 A | 10/1999 | Hale et al. | |
| 5,978,723 A | 11/1999 | Hale et al. | |

(Continued)

FOREIGN PATENT DOCUMENTS

DE    102005008105    8/2006

OTHER PUBLICATIONS

Science fiction becomes farming fact. PROFI ELECTRONICS. Precision Farming Event 2007. pp. 36-38, profi May 2007. Website: www.profi.co.uk.

(Continued)

*Primary Examiner* — Khoi Tran
*Assistant Examiner* — Jorge Peche

(57) ABSTRACT

A method and system for controlling a vehicle comprises a boundary establisher for establishing a boundary of a work area. A vehicle position sensor (e.g., a location-determining receiver) determines a position of the vehicle. A planner module plans a raw turn of a vehicle to be executed in accordance with a model turn pattern if the position of the vehicle has traversed the boundary. An adjustment module may adjust the raw turn of the vehicle to a compensated turn such that an implement coupled to the vehicle follows an implement path that substantially tracks the model turn pattern.

24 Claims, 7 Drawing Sheets

U.S. PATENT DOCUMENTS

| | | | |
|---|---|---|---|
| 5,991,694 A | 11/1999 | Gudat et al. | |
| 6,085,134 A | 7/2000 | Adam | |
| 6,119,069 A | 9/2000 | McCauley | |
| 6,128,574 A | 10/2000 | Diekhans | |
| 6,141,614 A | 10/2000 | Janzen et al. | |
| 6,236,924 B1 * | 5/2001 | Motz et al. | 701/50 |
| 6,266,595 B1 | 7/2001 | Greatline et al. | |
| 6,336,051 B1 | 1/2002 | Pangels et al. | |
| 6,345,231 B2 | 2/2002 | Quincke | |
| 6,463,374 B1 * | 10/2002 | Keller et al. | 701/50 |
| 6,643,576 B1 * | 11/2003 | O Connor et al. | 701/50 |
| 6,671,582 B1 * | 12/2003 | Hanley | 700/245 |
| 6,681,551 B1 | 1/2004 | Sheidler et al. | |
| 6,728,607 B1 * | 4/2004 | Anderson | 701/25 |
| 6,876,920 B1 * | 4/2005 | Mailer | 701/470 |
| 6,907,336 B2 | 6/2005 | Gray et al. | |
| 6,934,615 B2 * | 8/2005 | Flann et al. | 701/50 |
| 6,990,399 B2 | 1/2006 | Hrazdera et al. | |
| 7,010,425 B2 | 3/2006 | Gray et al. | |
| 7,079,943 B2 | 7/2006 | Flann et al. | |
| 7,110,881 B2 | 9/2006 | Gray et al. | |
| 7,162,348 B2 | 1/2007 | McClure et al. | |
| 7,216,033 B2 | 5/2007 | Flann et al. | |
| 7,228,214 B2 | 6/2007 | Flann et al. | |
| 7,363,154 B2 * | 4/2008 | Lindores | 701/26 |
| 7,451,030 B2 * | 11/2008 | Eglington et al. | 701/50 |
| 7,502,678 B2 * | 3/2009 | Diekhans et al. | 701/50 |
| 7,747,370 B2 * | 6/2010 | Dix | 701/50 |
| 8,131,432 B2 * | 3/2012 | Senneff et al. | 701/50 |
| 2002/0165649 A1 * | 11/2002 | Rekow et al. | 701/26 |
| 2003/0187560 A1 | 10/2003 | Keller et al. | |
| 2003/0187577 A1 * | 10/2003 | McClure et al. | 701/213 |
| 2003/0208319 A1 | 11/2003 | Ell et al. | |
| 2004/0006957 A1 * | 1/2004 | Sheidler et al. | 56/10.2 G |
| 2004/0158355 A1 | 8/2004 | Holmqvist et al. | |
| 2004/0193348 A1 * | 9/2004 | Gray et al. | 701/50 |
| 2004/0193349 A1 | 9/2004 | Flann et al. | |
| 2004/0217869 A1 | 11/2004 | Bouchard et al. | |
| 2005/0075785 A1 | 4/2005 | Gray et al. | |
| 2005/0197757 A1 * | 9/2005 | Flann et al. | 701/50 |
| 2005/0273253 A1 * | 12/2005 | Diekhans et al. | 701/202 |
| 2006/0025894 A1 | 2/2006 | O'Connor et al. | |
| 2006/0064216 A1 * | 3/2006 | Palmer | 701/41 |
| 2006/0064222 A1 | 3/2006 | Palmer | |
| 2006/0142913 A1 | 6/2006 | Coffee et al. | |
| 2006/0178820 A1 * | 8/2006 | Eglington et al. | 701/209 |
| 2006/0178825 A1 * | 8/2006 | Eglington et al. | 701/211 |
| 2006/0200294 A1 | 9/2006 | Scheufler et al. | |
| 2006/0237200 A1 | 10/2006 | Unruh et al. | |
| 2006/0241838 A1 * | 10/2006 | Mongiardo et al. | 701/50 |
| 2007/0083299 A1 * | 4/2007 | Lindores | 701/2 |
| 2007/0198159 A1 * | 8/2007 | Durkos et al. | 701/50 |
| 2007/0233348 A1 * | 10/2007 | Diekhans et al. | 701/50 |
| 2007/0233374 A1 * | 10/2007 | Diekhans et al. | 701/209 |
| 2008/0004778 A1 * | 1/2008 | Rekow | 701/50 |
| 2008/0103690 A1 * | 5/2008 | Dix | 701/207 |
| 2008/0103694 A1 * | 5/2008 | Dix et al. | 701/213 |
| 2008/0147282 A1 * | 6/2008 | Kormann | 701/50 |
| 2008/0249692 A1 * | 10/2008 | Dix | 701/50 |
| 2009/0118904 A1 * | 5/2009 | Birnie | 701/41 |

OTHER PUBLICATIONS

Harringa, Emily. Farming the Easy Way. Professional Surveyor Magazine. Mar. 2007.

* cited by examiner

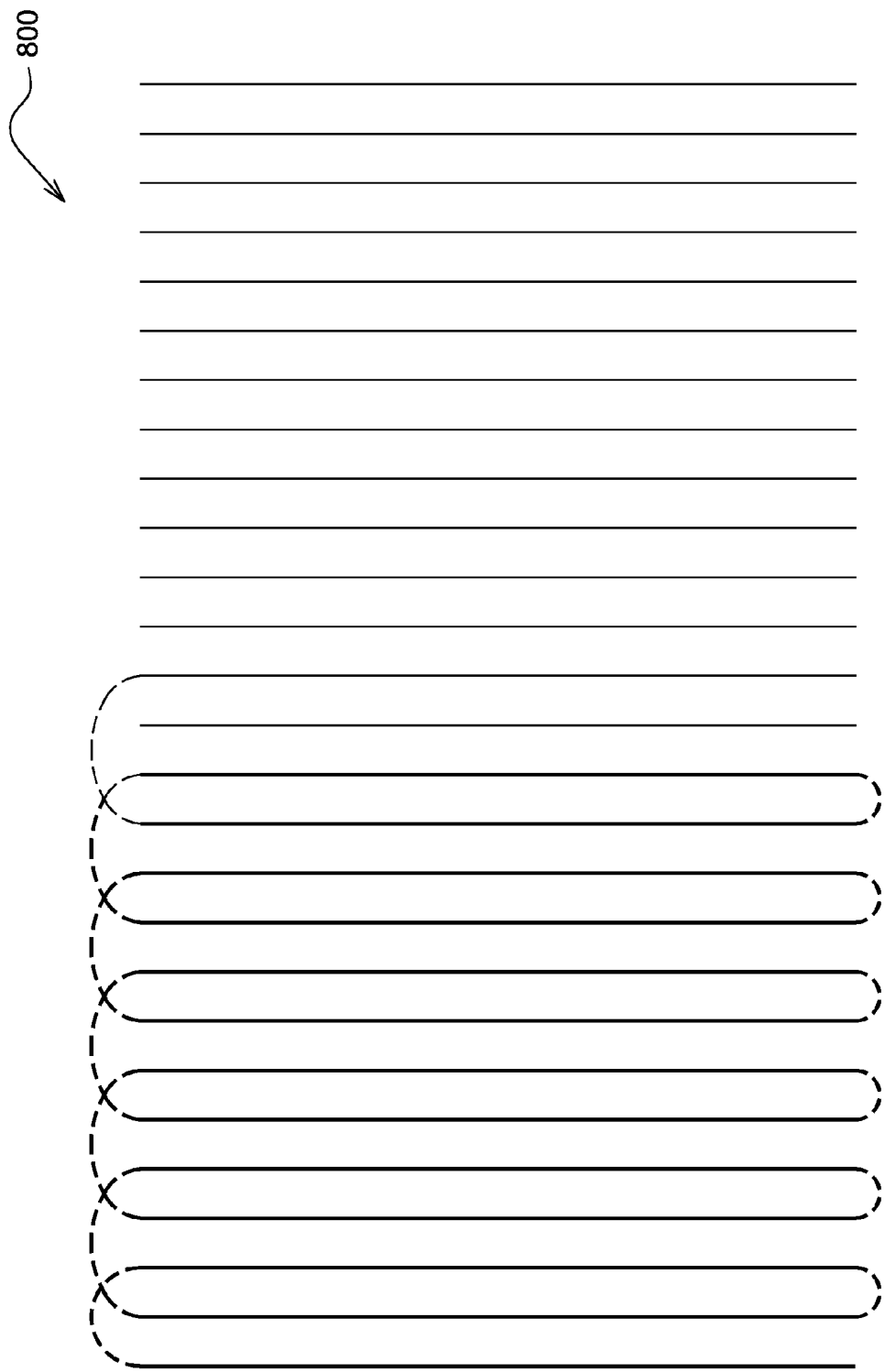

METHOD AND SYSTEM FOR GENERATING END TURNS

This document (including all of the drawings) claims priority based on and the benefit of the filing date of U.S. provisional application No. 60/962,643, filed on Jul. 31, 2007, and entitled METHOD AND SYSTEM FOR GENERATING END TURNS, under 35 U.S.C. 119(e).

FIELD OF THE INVENTION

This invention relates to a method and system for controlling a vehicle; and, more particularly, a method and system for generating end turns.

BACKGROUND

When operating equipment for field operations, an operator is usually responsible for executing end-turns at an edge or a boundary of a work area, unless the equipment is operating in an unmanned or autonomous mode. When making an end-turn with a vehicle (e.g., large equipment with significant width, such as combine or a planter), the operator may encounter difficulty in efficiently and consistently executing the end turn. For example, the operator may resort to a less efficient turn (or a larger headland) to ensure the operator has enough room to compensate for turn variation, terrain irregularity, or other factors. Inconsistent or inefficient turns may lead to one or more of the following: wasted fuel, wasted disbursed materials, unharvested crop, and poor aesthetic appearance of the mowed area or processed vegetation. Thus, a need exists for a system and method for providing real time planning of end turns and execution of end turns, and/or adjustment of end turns (e.g., while an operator is in the cab of the implement).

SUMMARY OF THE INVENTION

A method and system for controlling a vehicle comprises a boundary establisher for establishing a boundary of a work area. A vehicle position sensor (e.g., a location-determining receiver) determines a position of the vehicle. A planner module plans a raw turn of a vehicle to be executed in accordance with a model turn pattern if the position of the vehicle has traversed the boundary. An adjustment module may adjust the raw turn of the vehicle to a compensated turn such that an implement coupled to the vehicle follows an implement path that substantially tracks the model turn pattern.

BRIEF DESCRIPTION OF THE DRAWINGS

FIG. 8 represents further additional illustrative travel row sections, consistent with the method of FIG. 4.

DETAILED DESCRIPTION

A mapped area means a work area with boundaries that are mapped or otherwise defined. A designated area may refer to any portion of the work area or the entire work area. The designated area may mean a map object. A map object refers to a desired portion of the mapped area to be mowed, sprayed, harvested, treated, covered, processed or otherwise traversed to accomplish a task. The boundaries of the mapped area and the boundaries of the map object may be defined to be coextensive with each other, partially contiguous with each other or noncontiguous with each other, for example.

Figure 1A:
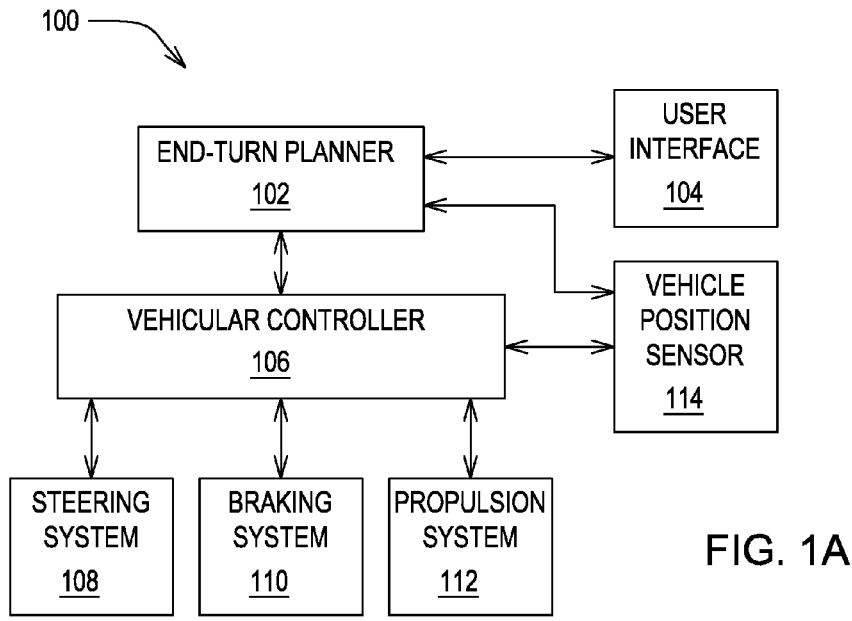
FIG. 1A is a block diagram of one embodiment of a vehicular control system for controlling a vehicle in accordance with the invention.

In accordance with one embodiment of the invention, FIG. 1A shows a block diagram of a system 100 for controlling a vehicle which includes an end turn planner 102. The end turn planner 102 may be coupled to a user interface 104 and a vehicular controller 106. Further, the end turn planner 102 may communicate with a vehicle position sensor 114 (e.g., location determining receiver). In one embodiment, the vehicular controller 104 may communicate with one or more of the following: a steering system 108, a braking system 110 and a propulsion system 112. The lines that interconnect the components of the system 100 may comprise logical communication paths, physical communication paths, or both. Logical communication paths may comprise communications or links betweens software modules, instructions or data, whereas physical communication paths may comprise transmission lines, data buses, or communication channels, for example.

The system 100 may be mounted on or carried by a vehicle. For instance, the vehicle may comprise any agricultural vehicle, agricultural equipment, a combine, a harvester, a tractor, mower, lawn and garden equipment, a construction vehicle, construction equipment, demining equipment, military equipment, mining equipment, or other types of vehicles.

The vehicle controller 106 accepts input data or an end turn plan of the end turn planner 102 and controls the vehicle consistent with the end turn plan. An end turn plan refers to a vehicle path, an implement path, or both. In one embodiment, the vehicle path, the implement path, or both may be defined as a series of points or coordinates that lie on the path or planned path of a vehicle. In another embodiment, the vehicle path, the implement path, or both may be defined as a quadratic equation or another equation that defines the position (or position versus time) of the vehicle or the implement.

The vehicle controller 106 may generate control signals for the steering system 108, the braking system 110, and the propulsion system 112 that are consistent with tracking the end turn plan. For example, the control signals may comprise a steering control signal or data message that is time dependent and defines a steering angle of the steering shaft; a braking control signal or data message that defines the amount of deceleration, hydraulic pressure, or braking friction applied to brakes; a propulsion control signal or data message that controls a throttle setting, a fuel flow, a fuel injection system, vehicular speed or vehicular acceleration. If the vehicle is propelled by an electric drive or motor, the propulsion control signal or data message may control electrical energy, electrical current, or electrical voltage to the electric drive or motor.

The steering system 108 may comprise an electrically controlled hydraulic steering system, an electrically driven rackand-pinion steering, an Ackerman steering system, or another steering system. The braking system 110 may comprise an electrically controlled hydraulic braking system, or another electrically controlled friction braking system. The propulsion system 112 may comprise an internal combustion engine, an internal combustion engine-electric hybrid system, an electric drive system, or the like.

The vehicle position sensor 114 may comprise a location-determining receiver (e.g., a Global Positioning System receiver with differential correction), a radar system, a laser radar or ladar system, a range finder, an ultrasonic position detector, a stereo vision system, an optical position system, or other device for determining the position (e.g., coordinates) of the vehicle, the implement or both with respect to a reference point. The end turn planner 102 may determine a planned implement path, a planned vehicle path or both may based on one or more of the following factors: a current receiver-determined position (e.g., from a Global Positioning System (GPS) receiver or another location-determining receiver), a heading or trajectory of the vehicle derived from two or more positions of the vehicle position sensor 114, a desired turn type, an implement model, and a vehicle model. The implement model may incorporate implement geometry such as the width, length, wheelbase, implement configuration, such as a pulled, pushed, hitch configuration or any other implement or vehicle implement characteristics. Similarly, the vehicle model may incorporate implement geometry such as the width, length, wheelbase, implement configuration, such as a pulled, pushed, hitch configuration or any other implement or vehicle implement characteristics.

Figure 1B:
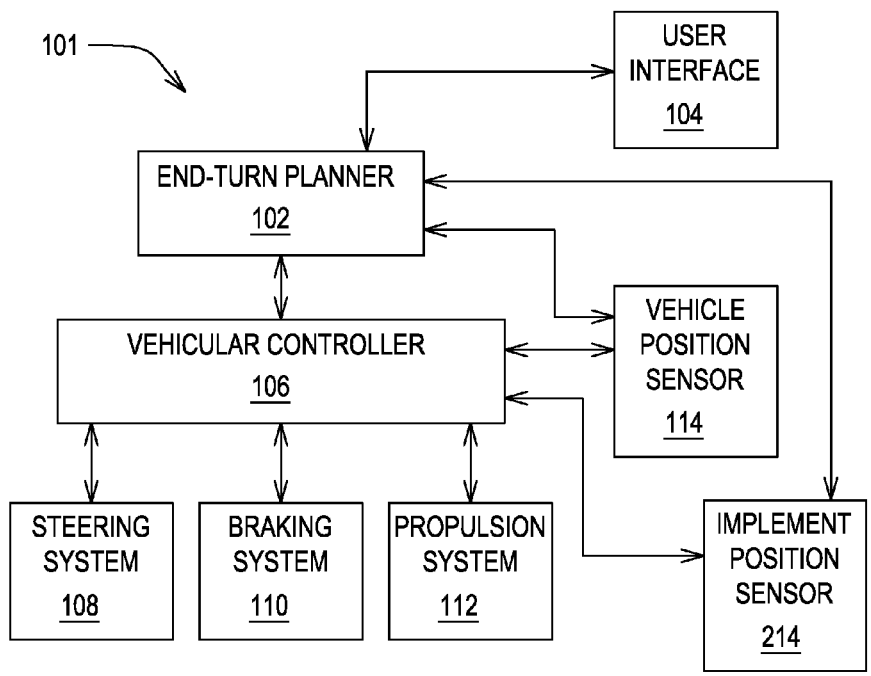
FIG. 1B is a block diagram of another embodiment of a vehicular control system for controlling a vehicle in accordance with the invention.

The system 101 of FIG. 1B is similar to the system 100 of FIG. 1A, except that the system 101 further comprises an implement position sensor 214 mounted or carried by the implement. The implement position sensor is capable of communicating with the vehicular controller 106 and the end-turn planner 102. The implement position sensor 214 may comprise a location-determining receiver (e.g., a Global Positioning System receiver with differential correction), a radar system, a laser radar or ladar system, a range finder, an ultrasonic position detector, a stereo vision system, an optical position system, or other device for determining the position (e.g., coordinates) of the implement with respect to a reference point (e.g., associated with the vehicle). Where the vehicle position sensor 114 and the implement position sensor 214 are used together on a vehicle-implement combination, the vehicle position sensor 114 may be assigned a vehicular identifier and the implement position sensor 214 may be assigned a implement identifier to facilitate distinguishing vehicle position data from implement position data (e.g., by the end turn planner 102).

Figure 2:
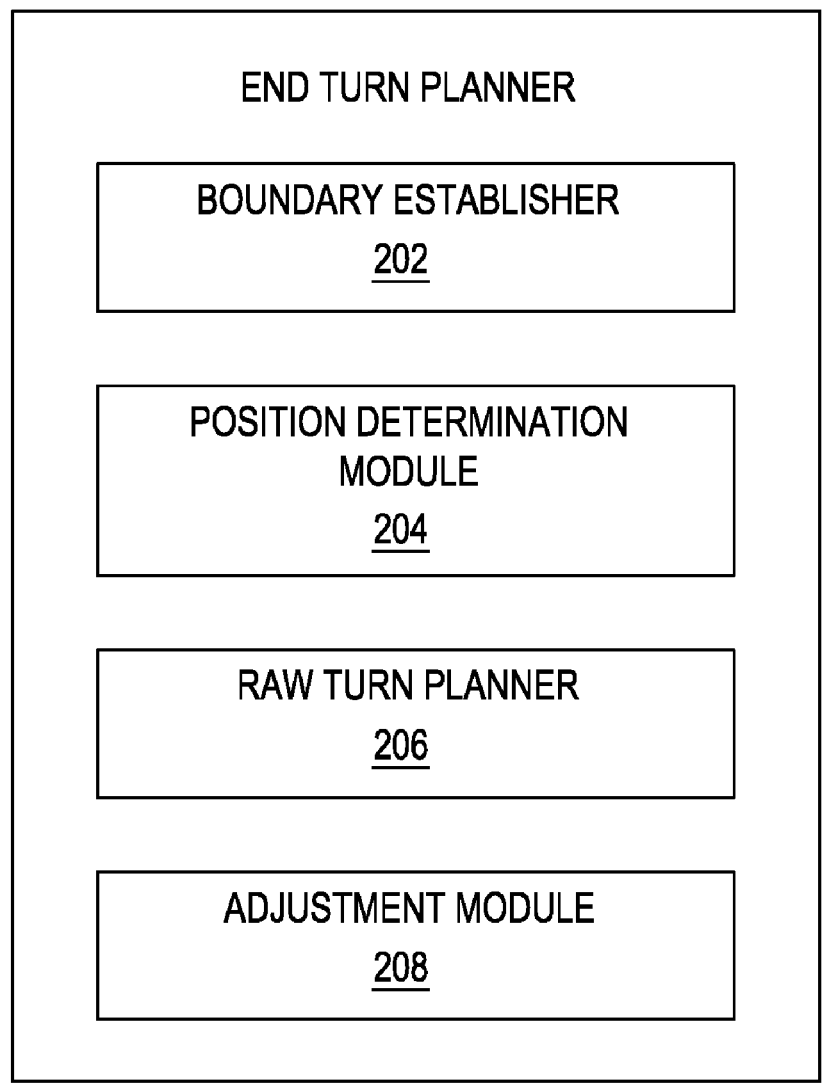
FIG. 2 is a block diagram of an illustrative end turn planner in greater detail than FIG. 1.

FIG. 2 shows a block diagram of an illustrative end turn planner 102 in greater detail. The end turn planner 102 determines a vehicle end turn path, an implement end turn path, or both. The end turn path may be based on a desired turn type (e.g., row skipping, light bulb, adjacent turn) and an implement model. The implement model may incorporate implement geometry such as the width, length, wheelbase and the like of the implement, and implement configuration, such as a pulled, pushed, hitch configuration and the like. The end turn planner 102 comprises a boundary establisher 202 for establishing a boundary of a work area and a position determination module 204 for determining a vehicle position of a vehicle, an implement position of an implement, or both. Boundary establisher 202 may comprise a boundary recording engine suitable for recording and storing boundary information. The boundary recording engine may load any type of boundaries, such as interior boundaries, exterior boundaries, and headland boundaries, associated with a terrestrial area such as a field or plot of land, and store the boundary data in memory. The loaded boundary data may be transmitted to other system components. The boundary recording engine may provide a notification upon completion of boundary loading.

In one embodiment, the boundary establisher 202 comprises an intersection tracking engine suitable for tracking an intersection. For example, the intersection may represent one or more of the following items: (1) an intersection between an implement path and a boundary or (2) an intersection between a vehicle path and a boundary (e.g., via the boundary recording engine). The intersection tracking engine may actively or passively search for past intersections in a mapped area, designated area or any other desired area.

One or more boundaries of the work area may be stored in data storage associated with the end-turn planner 102 in preparation for operation of the vehicle in the work area. During an initialization phase of the system 100 (e.g., when the system 100 is first activated for use in a certain work area), a collection of boundaries that are relevant to the work area may be retrieved from data storage or selected by the operator via the user interface 104. Alternatively, the end turn planner 102 may select the boundaries automatically based on a current location of the vehicle determined by the position sensor 114. The operator may enter or collect new boundaries via the user interface 104. The operator may store, retrieve, modify, or delete boundaries via an application programming interface (API) call to the data storage or database, for example.

For each vehicle path or implement path that is relevant to a work area, the end turn planner 102 may queries a path intersection tracking engine on a per path basis. Path intersection tracking engine returns to intersection tracking engine the intersections that occur on the specified path. The intersection tracking engine caches the intersections reported by path intersection tracking engine and returns a list of intersections. The list of intersections may be reviewed and attributes may be set about an intersection via the user interface 104 (e.g., through an API call on a per intersection basis).

One attribute is whether to ignore the intersection when requesting the closest intersections or not. Intersections marked as "ignored" may later be set to "unignored" via the user interface 104 (e.g., through an API call). The other attribute is what type of region transition takes place at the intersection. When there is a path change, the intersections cached by the intersection tracking engine may be cleared (e.g., via through an API call) by the intersection tracking engine.

A current or a future vehicle path or implement path may become a new path or a modified path. The intersection tracking engine may be notified that the intersection tracking engine needs to refresh the intersection tracking engine cache of intersection points. To accomplish cache refresh, an intersection tracking engine owner requests a list of all intersections. When the list of intersections is requested, the intersection tracking engine validates the status of future intersections. The intersection tracking engine discards intersections that are no longer valid and finds all new intersections. The updated list of intersections may be reviewed and intersection attributes may be modified if desired.

At any moment in time when the position determination module 204 establishes the current location of the vehicle information regarding the closest boundary intersections to the current position may be required. A closest future and a closest past intersections may be requested. If a future intersection exists that is not discarded, the intersection tracking engine returns the closest future intersection that is not being ignored; otherwise an indication may be made that a future intersection is not found. If a past intersection exists that is not discarded, the intersection tracking engine returns the closest past intersection considered; otherwise the intersection tracking engine indicates a past intersection was not found. Also, a collection of impassable and field boundaries is present, a collision detection engine may determine the distance to the nearest collision at every GPS epoch.

Boundary establisher 202 communicates established boundary data to position determination module 204. Position determination module 204 obtains location data (e.g., geographic position or geographic coordinates) of the vehicle with respect to a work area for the vehicle. The position determination module 204 may communicate with the position sensor 114 (e.g., a Global Positioning System (GPS) receiver with differential correction). In an additional embodiment, an optical or laser positioning system which measures the implement position in real time relative to the receiver-determined position (e.g., GPS position) during the turn may be mounted onto an implement. Position determination module 204 is suitable for estimating the implement path based on a receiver-determined position (e.g., GPS position), a desired turn type or an implement model. According to an embodiment of the invention, the implement model comprises implement geometry and implement configuration. The estimated implement path is estimated based on an implement-mounted, optical or laser positioning system suitable for measuring the implement position in real time relative to the receiver-determined position (e.g., GPS position) during the turn. The implement model is evaluated to determine if a particular turn is possible and will not use more space than a specified area or zone allocated for a turn.

In one embodiment, the system 100 may also comprise an implement position sensor 114 (e.g., optical or laser position sensor) mounted on the implement and in communication with the position determination module 204. Position sensor 114 may provide a relative position of the implement relative to the determined position of the location determining receiver mounted on the vehicle. The relative position determined by the position sensor 114 may be utilized by the adjustment module 208, as will be described, to track the model turn pattern. Position sensor 114 may be a laser navigation system that interacts with several active transmitting beacons or passive reflective beacons at corresponding known, fixed locations or a radio frequency navigation system that interacts with several active transmitting beacons or passive reflective beacons at corresponding known fixed locations. A vehicle-mounted receiver of the laser navigation system or radio frequency navigation system may determine the time of arrival, the angle of arrival, or both, of electromagnetic signals (e.g., optical, infra-red or radio frequency) propagating from three or more beacons to determine location data for the vehicle as the vehicle moves throughout the mapped area or work area. The navigation system provides location data of the vehicle with respect to a reference location or in terms of absolute coordinates with a desired degree of accuracy (e.g., a tolerance within a range of plus or minus 2 centimeters to plus or minus 10 centimeters from the actual true location of the vehicle).

End turn planner 102 also comprises a raw turn planner 206 for planning a raw turn of a vehicle in communication with the boundary establisher 202 and position determination module 204. Raw turn planner may execute a raw turn in accordance with a model turn pattern if the determined position traverses the boundary. Raw turn planner 206 is suitable for creating a turn when a headland boundary is approaching. An alert may be transmitted to the operator that a turn is approaching. Raw turn planner 206 locates an available turn path and acquires a path before the turn and after the turn. After a path has been located, the raw turn planner 206 acquires information regarding the path such as a back farthest ordered point, a corresponding segment index of the boundary, or a path identification number (ID) of the path utilized to find the intersection from the headland boundary. Point acquisition is accomplished via an API call to a boundary transition monitor. Raw turn planner 206 acquires the path for the respective path ID and sets an end point on the path. A path creator is called via an API call to compute an end point corresponding with the path ID. Upon computation of the end point, the path creator sets the path end point. Raw turn planner 206 calls an implement guidance API to an implement guidance engine to update the end point to correspond to the path creator-created end point. Implement guidance engine acquires the end point and computes an implement path end point. The implement path positions the implement to keep the implement on the implement path and is determined by an implement guidance engine. Raw turn planner 206 calls a set path end point API to set the implement path end point given the implement path ID and computed implement path end point. Raw turn planner 206 saves the implement path end point as a turn start position and creates a current mode future path via an API call to a create a next path using, for instance, the number of skips, track spacing and the turn direction. The raw turn planner 206 may also determine future interest points, first intersect points, past intersect points or next intersect points for the current path. Raw turn planner 206 may set an intersect point for the current path as the turn end position. Raw turn planner 206 may register the boundary turn path with a path manager.

End turn planner 102 may further comprise an adjustment module 208 for adjusting the raw turn of the vehicle in communication with at least one of the raw turn planner 206, the position determination module 204 and the boundary establisher 202. An adjustment module 208 may be utilized to improve the positioning accuracy of the implement during the boundary turn. The "ideal" path is utilized for the implement path (instead of the vehicle path). System adjustment module 208 allows tuning adjustments to be made to a turn. Adjustments may include pushing a turn further into the headland, making a larger or smaller turn radius or any other adjustment suitable for creating a plurality of guess rows as needed for the end turn pattern. A guess row is a measure of driving accuracy. An operator may execute a pass with a work implement. A typical work implement (such as a planter) traverses or creates multiple rows in a single pass through a farm field, and each row is established on the ground substantially evenly spaced according to the mechanical arrangement of the implement, such as the spacing of the row units on a planter (e.g., a common row spacing is 3" inches from one row to the next). An operator may execute an adjacent pass with the same implement, establishing a new set of substantially evenly perfectly spaced rows. It is contemplated that at least one row between the two passes having a spacing not determined by the mechanical setup of the implement, but rather how accurately the two adjacent passes were driven. This row is commonly referred to as a "guess row" or an "odd row", or a "middle". In a typical field, there may be one guess row for every pass made by the implement through the field. A highly accurate guess row will be spaced similarly to the rows established by the implement (e.g., consistently 3" wide) A low accuracy guess row will have variation (e.g., wider than 3", narrow than 3" or both) as compared to the row spacing established by the implement. System and method may provide accurate guess rows at the point of intersecting with the boundaries.

The turn pattern repeats for all subsequent passes in the field. When the boundary at the edge of a work area changes, the end turn planner 102 identifies the change and continues to make the turn until the vehicle and implement are back in the field. Similarly, when an angled portion of the approaching boundary is crossed, the end turn planner 102 makes a turn such that the vehicle and implement enter back into the field at the angle that best allows the end turn planner to match the previous passes.

For the specific case where the spacing between a first pass and a next is less than the turn radius of the vehicle and implement, the system automatically bulges the turn to maintain the turn radius requirement, such as executing a lightbulb turn pattern or the like. A turn radius may be adjusted to be very small (e.g., <1 ft turn radius) for setups like tracked vehicles with mounted implements or can be very large as in the case of a four wheel drive (4WD) vehicle with a large towed planter (e.g., up to 150 ft turn radius).

Figure 3:
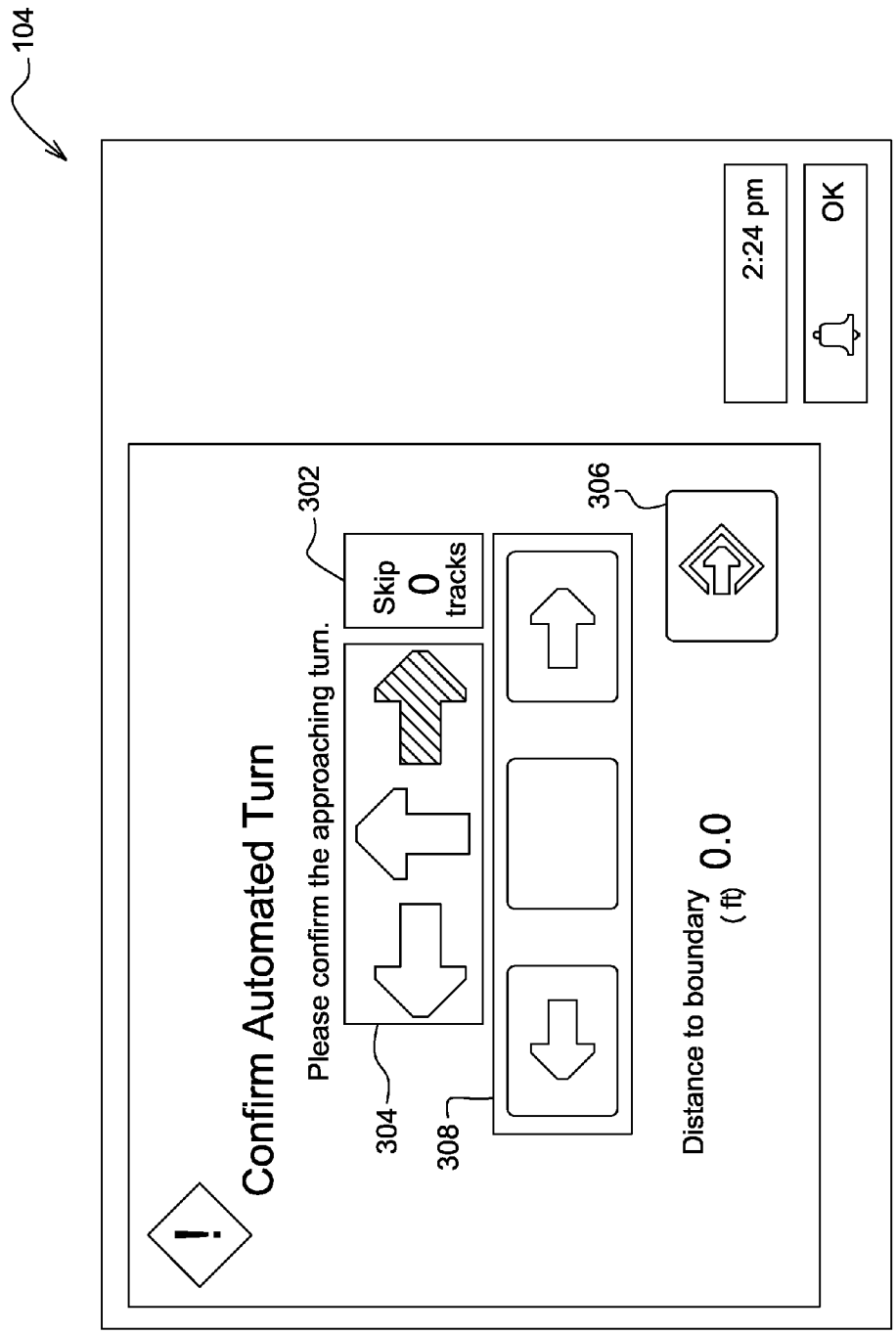
FIG. 3 represents a graphical display of a user interface in accordance with the invention.

FIG. 3 represents a graphical display of a user interface 104 in accordance with the invention. The vehicle operator defines the headland and field boundaries as well as various parameters of the vehicle and implement (e.g., width, turn radius, length, turn pattern) via the user interface 104, an begins operating the vehicle in the field. When the vehicle approaches a headland boundary, end turn planner 102 prescribes a turn to pull the vehicle into the next pass with the most efficient end-turn possible in terms of headland size required. User interface 104 may display a plurality of settings suitable for operator selection such as a number of skips selection 302, a turn direction indicator 304, a confirm turn warning indicator 306, an acknowledgement message 308 acknowledging modifications such as turn direction modification, a modification of the minimum number of skips, or both, a turn pattern type selection (not shown), or any other setting that may be selectable by a user. The operator may modify any of the turn settings if desired. For instance, the operator may acknowledge the predicted turn direction, toggle the turn direction, or change number of skips settings. It is contemplated that the operator may be alerted of the approaching turn. A user may also be capable of acknowledging a turn indication warning via the user interface 104 before the end turn planner predicts the turn. Based on the configured turn pattern type, number of skips and the state of a turn pattern state vehicle, a turn direction indicator may be issued some amount of time prior to turning or starting a sequence. If operator acknowledges the alert without modifying a turn setting, the turn settings are accepted and a next turn path may be predicted. If the operator modifies changes the turn direction or number of skips, the new number of skips setting is saved and the turn pattern state vehicle is reset unless the state vehicle is in an initialized state. If the turn pattern state for the vehicle is in an initialized state, a new turn direction may be utilized to initialize a turn pattern state vehicle. Furthermore, new parameters may be utilized to predict a next turn path.

Although the vehicle automatically follows the end-turn path, it is contemplated that the operator may at anytime manually control the vehicle. Manual control may be initiated by manually steering away from the determined path. The operator may also control vehicle speed, braking and transmission shifting as desired. The automated end-turns are designed to ensure uniform guess rows at the beginning and end of the pass and compensate for implement draft when using drawn implements and the shape of the turn required for the vehicle and type of implement.

Figure 4:
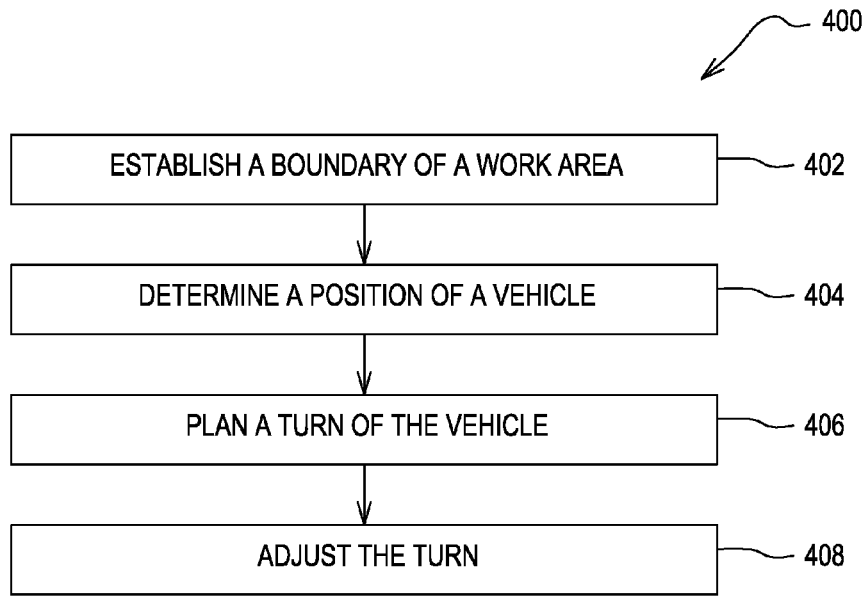
FIG. 4 is a flow chart of a method for vehicle control in accordance with the invention.

FIG. 4 is a flow chart of a method 400 for vehicle control in accordance with the invention. The method of FIG. 4 begins in step 402.

In step 402, the boundary establisher 202 or the end turn planner 102 establishes a boundary of a work area.

In step 404, a position determination module 204, the end turn planner 102, or position sensor (114 or 214) determines a position of the vehicle, the implement, or both. For example, the position determination module 114 may receive position data (e.g., coordinates) from the vehicle position sensor 114, the implement position sensor 214, or both. If the position determination module 204 receives vehicle position data from a location determining receiver or the vehicle position sensor (114 and/or 214), the position determination module 204 may estimate corresponding implement position data based on the vehicle configuration and dimensions, the implement configuration and dimensions, and the attachment configuration between the vehicle and implement.

In step 406, the raw turn planner 206 or end turn planner 102 plans a raw turn of a vehicle. For example, the raw turn planner 206 or the end turn planner 102 plans a turn to be executed in accordance with a planned model turn pattern if the determined position (e.g., vehicle position) of the vehicle traverses the boundary. However, in an alternate embodiment, the raw turn planner 206 or the end turn planner 102 plans a turn to be executed in accordance with a planned model turn pattern if the determined implement position of the implement (e.g., a trailing or leading edge of the implement) traverses the boundary.

In step 408, the adjustment module 208 or the end turn planner 102 adjusts the raw turn of the vehicle 408 to a compensated turn such that an implement coupled to the vehicle follows a target implement path or desired implement path that substantially tracks the planned model turn pattern. Step 408 may be executed in accordance with various techniques that may be applied separately or cumulatively. Under a first technique, the adjustment module 208 or the end turn planner 102 estimates an implement path based on an implement position of the implement. To this end, method 400 may comprise obtaining location data (e.g., geographic position or geographic coordinates) of the vehicle with respect to a work area for the vehicle and converting the vehicle location data to implement position or location data. Obtaining vehicle location data may be accomplished via a Global Positioning System (GPS) receiver with differential correction.

Under a second technique, the adjustment module 208 or end turn planner 102 may establish a desired implement path based on a desired turn type (e.g., row skipping, light bulb, adjacent turn) and an implement model. The implement model may incorporate implement geometry such as the width, length, wheelbase and the like of the implement, and implement configuration, such as a pulled configuration, a pushed configuration, a hitch configuration, or any other implement configuration.

Under a third technique, an implement model is evaluated to determine if a raw turn is executable and capable of execution without traversing a geographic area greater than a specified area or zone allocated for the raw turn. Step 408 may further comprise selecting an alternative type of turn if an initial selection is unexecutable within the specified area. For example, the tightest turn possible may be degraded because of wheel slippage factor, which can be based on the general soil type (e.g., sand, clay etc.) or moisture content, and an alternative turn type may be utilized to compensate for a degradation in a region of the work area.

Under a fourth technique, an adjustment module 208 or end turn planner 102 may generate an adjustment to the raw turn based on whether the desired implement is linkage mounted, hitch mounted, trailed or semi-mounted. For example, adjustments may be determined by selecting the model turn pattern on a hierarchical basis. The hierarchical basis prefers a row skipping mode as a preferential model turn pattern to an alternate pass mode and a bulb turn mode, unless there is insufficient space between the boundary and the border to execute the row skipping mode. The hierarchical basis prefers the alternate pass mode as a preferential model turn pattern to a bulb turn mode, unless there is insufficient space between the boundary and the border to execute the alternate pass mode.

In an additional embodiment, a method for controlling a vehicle comprises establishing an interior boundary of a work area and a border, determining a position of the vehicle via a location determining receiver, planning, via a user interface of the vehicle while operating the vehicle in the work area, a raw turn of a vehicle to be executed from a starting point coincident with a vehicular path segment (e.g., initial row, linear path segment or contour path segment) in accordance with a model turn pattern if the determined position traverses the boundary, and adjusting the raw turn of the vehicle to a compensated turn such that the vehicle and the implement stay within an authorized zone between the boundary and a border of the work area and such that an end point of the compensated turn is generally aligned with or coextensive with a next vehicular path segment (e.g., next row, linear path segment or contour path segment) to be traversed within the work area.

Figure 5:
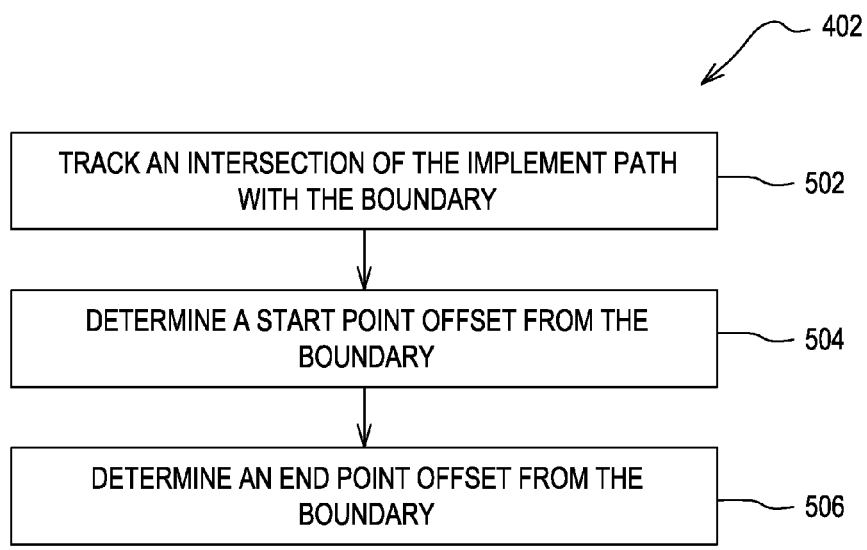
FIG. 5 is a flow chart of a method for the step of establishing a boundary as referred to in the method of FIG. 4.

Referring to FIG. 5, the step 402 of establishing a boundary of a work area may further comprise executing steps 502, 504 and 506.

In step 502, the boundary establisher 202 or the end turn planner 102 tracks an intersection of the desired implement path with the boundary. In one embodiment, tracking an intersection may be accomplished via an intersection tracking engine suitable for detecting an intersection of the desired implement path and the boundary from multiple inputs (e.g., a database data, closest past intersection data, closest future intersection data, boundary data, past boundary data, future boundary data, likely boundary data). The intersection tracking engine may utilize a database to determine a set of closest past intersection data or closest future intersection data for a given path base from a given collection of boundaries. In one example, the database may contain a collection of boundaries inputted via the user interface 104. Inputs may include data collected regarding a past or a future boundary. Boundary data may be sorted to determine boundaries likely to intersect at a given path base or planned path structure. A sorted boundary may be inspected for intersection between the path base and the boundary. Intersection tracking engine may be capable of analyzing future or past intersection data, to determine a closest future or closest past intersection point and provide the data as requested.

In step 504, the boundary establisher 202 or the end turn planner 102 determines a start point offset from the boundary. Step 504 may be carried out in accordance with various techniques that may be applied alternately or cumulatively.

Under a first technique, a start point offset determination of a turn path begins with using the intersection position obtained from a boundary transition monitor or from the intersection tracking engine. In a first example, the intersection position represents the implement position when the implement has completely crossed the boundary. In a second example, the intersection position represents the implement position when the implement has completely left the work area. The implement may leave the work area to minimize the number of skips or skipped rows. In a third example, the intersection position represents the implement position when the implement has started to leave the work area. The implement may leave the work area to minimize overlap to cover or traverse a work area with the implement.

Under a second technique, a start point of the implement turn is determined by shifting the intersection position back into or toward a work area. In one embodiment, the amount of the shift is generally equal to the start point headland offset.

Under a third technique, a start point of the implement turn may be selected for consistency between the start point and the end point of the implement turn path. Accordingly, those candidate implement turns that are not associated with consistent start points and end points are rejected or eliminated from further searching for a preferential start point and end point of the implement path turn. The resultant point of the implement turn is set as the end point of the implement path before the turn. After the end point has been set, the respective vehicle path may be updated. The start point of the vehicle turn is set to match the end point of the vehicle path before the turn. Matching may be accomplished after the vehicle path is updated.

Under a fourth technique, via the user interface 104 an operator may shift a starting point or an end point of the turn in the work area by an increment or a decrement to compensate for field conditions or variations in the field boundaries.

Under a fifth technique, the end turn planner 102, adjustment module 208 or user interface 104 limits the increment or the decrement by a spatial shift or a temporal shift based on an impassable boundary beyond the boundary to avoid the vehicle or the implement traversing the impassible boundary.

Under a sixth technique, the end turn planner 102, adjustment module 208 or user interface 104 may adjust at least one of a starting point and an end point of the turn dynamically in the work area by an increment or a decrement based on a previous execution of a turn to align the end point with the boundary.

In step 506, the boundary establisher 202 or the end turn planner 102 determines an end point offset from the boundary 506 for the desired implement path proportional to a ground speed of the vehicle. Step 506 may be executed in accordance with various procedures that may be applied separately or cumulatively.

Under a first procedure, locating the end point offset 506 of a turn path begins with using the intersection between the headland boundary and the vehicle path that follows the turn. In one embodiment, a next vehicle path may be created for the current tracking mode. The intersection is located by utilizing a function of a raw turn planner 206.

Under a second procedure, the end point of the vehicle turn is located by shifting the intersection of the next vehicle control path into or toward the field. In one embodiment, the amount of shift is approximately equal to the receiver inline offset minus the end point headland offset. The resultant point or end point may represent a next beginning point of the vehicle path for the next row after the turn. After the next beginning point of the vehicle path after the turn has been set, the end turn planner 102 makes a call to the extent path creator which updates the respective implement path.

Under a third procedure, end point of the implement turn may be selected for consistency between the start point and the start point of the implement turn path. Accordingly, those candidate implement turns that are not associated with consistent start points and end points are rejected or eliminated from further searching for a preferential start point and end point of the implement path turn. The end point of the implement turn is set to match the start point of the vehicle path after the turn. In one configuration, the end point and start point match may be completed subsequent to an update call to the extent path creator.

Under a fourth procedure, via the user interface 104 an operator may shift a starting point or an end point of the turn in the work area by an increment or a decrement to compensate for field conditions or variations in the field boundaries.

Under a fifth procedure, the end turn planner 102, adjustment module 208 or user interface 104 limits the increment or the decrement by a spatial shift or a temporal shift based on an impassable boundary beyond the boundary to avoid the vehicle or the implement traversing the impassible boundary.

Under a sixth procedure, the end turn planner 102, adjustment module 208 or user interface 104 may adjust at least one of a starting point and an end point of the turn dynamically in the work area by an increment or a decrement based on a previous execution of a turn to align the end point with the boundary.

Method 400 may further comprise allowing an operator operating the vehicle in the work area to dynamically select a turn mode corresponding to the model turn pattern from an alternate pass mode, a row skipping mode, and a bulb turn mode. Method 400 may allow the operator to dynamically select the turn mode up to a minimum time duration or a minimum distance from approaching the boundary. Method 400 may also be suitable for alerting an operator via a user interface prior to executing the compensated turn.

Method 400 may also comprise allowing an operator operating the vehicle in the work area to dynamically select a turn mode corresponding to the model turn pattern from an alternate pass mode, a row skipping mode, and a bulb turn mode, and allowing the operator to dynamically select the turn mode up to a minimum time duration or a minimum distance from approaching the boundary. A turn path may be created in real time and does not require manual intervention.

Method 400 may allow the operator to shift a starting point or an end point of the turn in the work area by an increment or decrement to compensate for field conditions, curves, discontinuities, jogs, obstacles, variations or irregularities in at least one of the border and the boundary. Method 400 may further provide adjustment of at least one of a starting point and an end point of the turn dynamically in the work area by an increment or a decrement based on a previous execution of a turn to align the end point with the boundary. Method 400 may also limit the increment or decrement by a spatial shift or a temporal shift based on an impassable boundary beyond the boundary to avoid the vehicle or the implement traversing the impassible boundary. Method 400 may alert an operator via a user interface of a compensated turn prior to be executed prior to executing the compensated turn.

Method 400 may also comprise mounting a position sensor (e.g., optical or laser position sensor) on the implement such that the position sensor provides a relative position of the implement relative to the determined position of the location determining receiver mounted on the vehicle. The adjustment utilizes the relative position to track the model turn pattern. Position sensor may be a laser navigation system that interacts with several active transmitting beacons or passive reflective beacons at corresponding known, fixed locations or a radio frequency navigation system that interacts with several active transmitting beacons or passive reflective beacons at corresponding known fixed locations. A vehicle-mounted receiver of the laser navigation system or radio frequency navigation system may determine the time of arrival, the angle of arrival, or both, of electromagnetic signals (e.g., optical, infra-red or radio frequency) propagating from three or more beacons to determine location data for the vehicle as the vehicle moves throughout the mapped area or work area. The navigation system provides location data of the vehicle with respect to a reference location or in terms of absolute coordinates with a desired degree of accuracy (e.g., a tolerance within a range of plus or minus 2 centimeters to plus or minus 10 centimeters from the actual true location of the vehicle).

Figure 6:
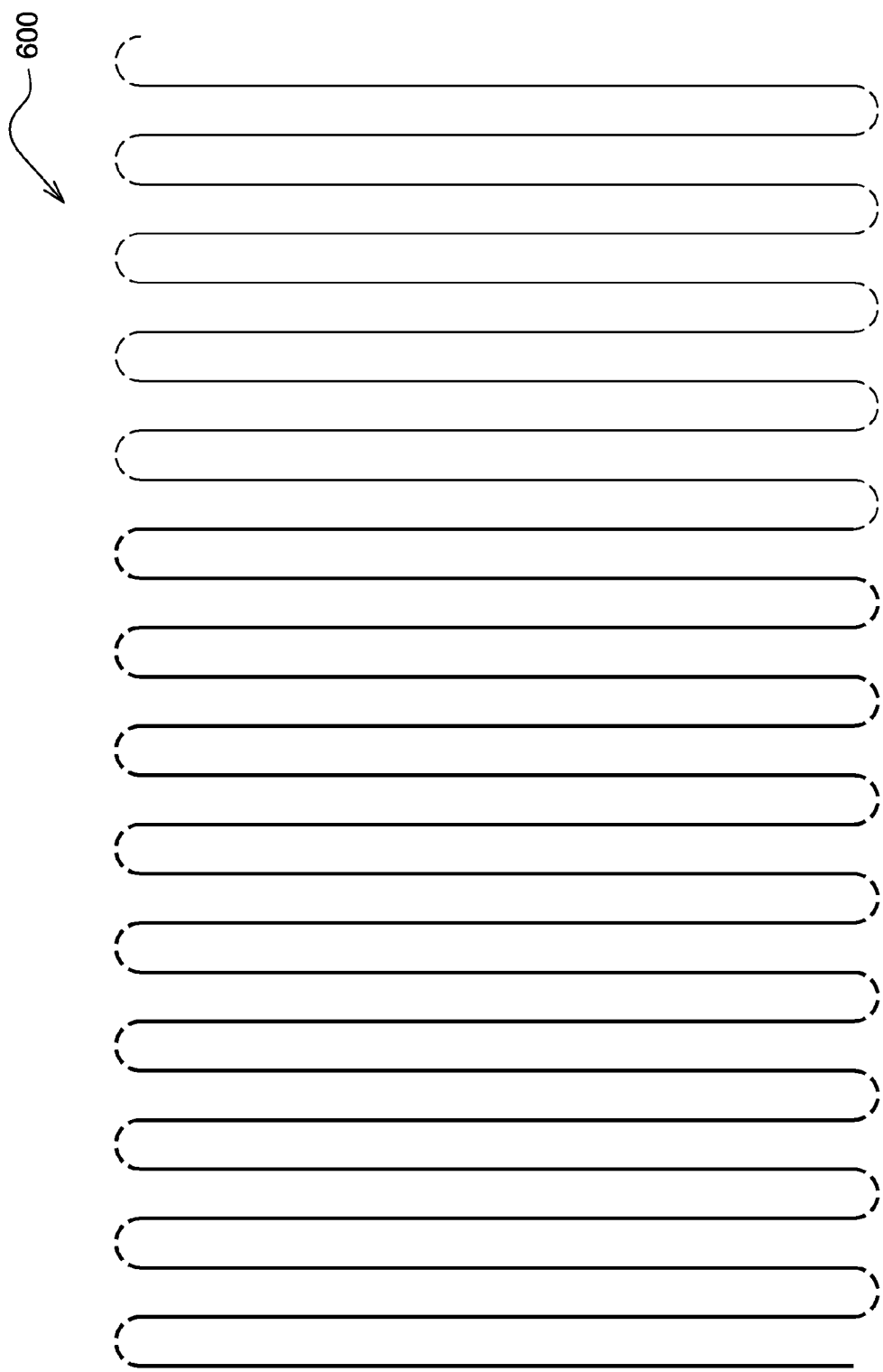
FIG. 6 represents illustrative travel row sections, consistent with the method of FIG. 4.
Figure 7:
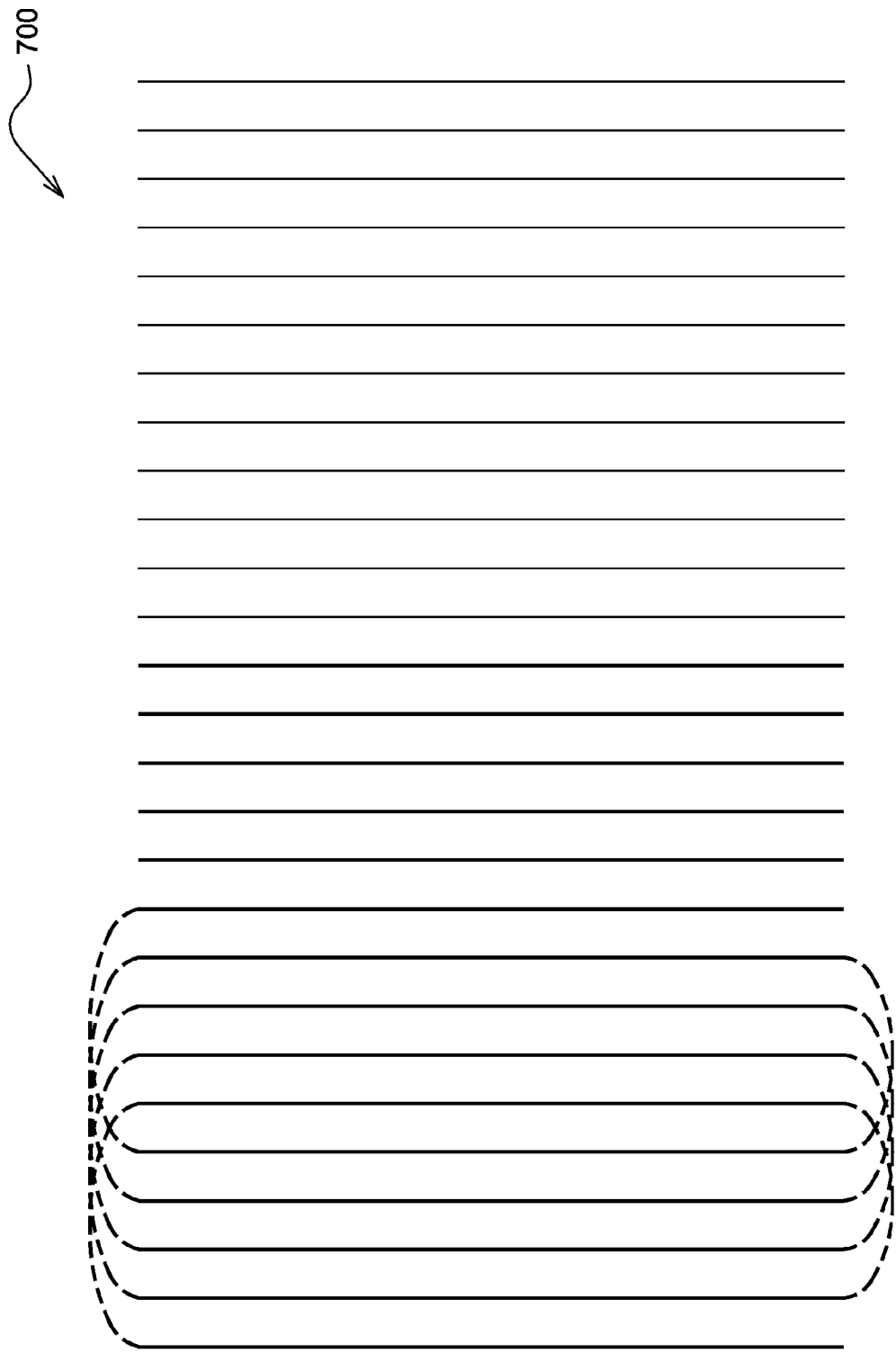
FIG. 7 represents additional illustrative travel row sections, consistent with the method of FIG. 4.

Referring to FIGS. 6-8, illustrative travel row sections are shown. While in the field, the operator can select from a pre-defined set of turn patterns: alternating passes, skip pass, or skip and fill patterns. Referring specifically to FIG. 6, an alternate pass configuration 600 is illustrated. In the turn pattern of FIG. 6, the direction is toggled (right, left and right) alternately. Referring to FIG. 7, an "Always Skip N" configuration 700 is illustrated. In the configuration of FIG. 7, "n+1" tracks are skipped going in the forward direction, and "n" tracks are skipped in the opposite direction. The turn direction is set to right initially. After completing all the turns in the same direction, the turn direction is toggled and the pattern is followed. Referring specifically to FIG. 8, an "Always Skip 0" configuration 800 is illustrated. Additional skip options are available, such as an option for "First Turn Skip," which allows the system 100 to always skip at least one pass, thereby ensuring only a U-turn is created.

It is to be understood that the present invention may be conveniently implemented in forms of a software package. Such a software package may be a computer program product which employs a computer-readable storage medium including stored computer code which is used to program a computer to perform the disclosed function and process of the present invention. The computer-readable medium may include, but is not limited to, any type of conventional floppy disk, optical disk, CD-ROM, magneto-optical disk, ROM, RAM, EPROM, EEPROM, magnetic or optical card, or any other suitable media for storing electronic instructions.

The specific order or hierarchy of steps in the foregoing disclosed methods are examples of exemplary approaches. Based upon design preferences, it is understood that the specific order or hierarchy of steps in the method can be rearranged while remaining within the scope of the present invention. The accompanying method claims present elements of the various steps in a sample order, and are not meant to be limited to the specific order or hierarchy presented.

The method and system and many of its attendant advantages will be understood by the foregoing description, and it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

The following is claimed:

1. A method for controlling a vehicle, the method comprising:
   establishing an interior boundary within a work area and a border of the work area;
   determining a position of the vehicle via a location determining receiver;
   planning a raw turn of the vehicle to be executed in accordance with a model turn pattern when the determined position traverses the boundary;
   adjusting the raw turn of the vehicle to a compensated turn such that an implement coupled to the vehicle follows an implement path that substantially tracks the model turn pattern;
   evaluating an implement model to determine whether a raw turn is executable and capable of execution without traversing a geographic area greater than a specified area allocated for the raw turn; and selecting an alternative type of turn when an initial selection is unexecutable within the specified area.

2. The method according to claim 1 wherein the implement path is estimated based on at least one of a receiver-determined position, a turn type or an implement model.

3. The method according to claim 2 wherein the implement model comprises at least one of implement geometry and implement configuration.

4. The method according to claim 2 wherein the implement path is estimated based on at least one of an implement-mounted, an optical positioning system or a laser positioning system suitable for measuring the implement position in real time relative to the receiver-determined position during the turn.

5. The method according to claim 1 wherein the adjusting is based on whether the implement is linkage mounted, hitch mounted, trailed or semi-mounted.

6. The method according to claim 1 further comprising:
tracking an intersection of the implement path with the boundary, and
determining a start point offset from the boundary and an end point offset from the boundary for the implement path proportional to a ground speed of the vehicle.

7. The method according to claim 1 further comprising:
mounting a position sensor on the implement such that the position sensor provides a relative position of the implement relative to the determined position of the location determining receiver mounted on the vehicle, wherein the adjusting uses the relative position to track the model turn pattern.

8. The method according to claim 1 further comprising:
allowing an operator operating the vehicle in the work area to dynamically select a turn mode corresponding to the model turn pattern from an alternate pass mode, a row skipping mode, and a bulb turn mode.

9. The method according to claim 8 further comprising:
allowing the operator to dynamically select the turn mode up to a minimum time duration or a minimum distance from approaching the boundary.

10. The method according to claim 1 further comprising:
allowing an operator to shift a starting point or an end point of the raw turn in the work area by an increment or a decrement to compensate for at least one of a field condition, a curve, a discontinuity, a jog, an obstacle, a variation or an irregularity in the boundary.

11. The method according to claim 10 further comprising:
limiting the increment or the decrement by a spatial shift or a temporal shift based on an impassable boundary beyond the boundary to avoid the vehicle or the implement traversing the impassible boundary.

12. The method according to claim 1 further comprising:
adjusting at least one of a starting point and an end point of the turn dynamically in the work area by an increment or a decrement based on a previous execution of a turn to align the end point with the boundary.

13. The method according to claim 1 further comprising:
alerting an operator via a user interface prior to executing the compensated turn.

14. A method for controlling a vehicle the method comprising:
establishing an interior boundary of a work area and a border of the work area;
determining a position of the vehicle via a location determining receiver;
planning, via a user interface of the vehicle while operating the vehicle in the work area, a raw turn of the vehicle to be executed from a starting point coincident with a vehicular path segment in accordance with a model turn pattern when the determined position traverses the interior boundary;
adjusting the raw turn of the vehicle to a compensated turn such that the vehicle and an implement coupled to the vehicle stay within an authorized zone between the interior boundary and the border of the work area and such that an end point of the compensated turn is generally aligned with or coextensive with a next vehicular path segment to be traversed within the work area;
evaluating an implement model to determine whether the raw turn is executable and capable of execution without traversing a geographic area greater than a specified area allocated for the raw turn; and
selecting an alternative type of turn when an initial selection is unexecutable within the specified area.

15. The method according to claim 14 wherein the adjusting comprises selecting the model turn pattern on a hierarchical basis.

16. The method according to claim 15 wherein the hierarchical basis prefers a row skipping mode as a preferential model turn pattern to an alternate pass mode and a bulb turn mode, unless insufficient space exists between the interior boundary and the border to execute the row skipping mode.

17. The method according to claim 16 wherein the hierarchical basis prefers the alternate pass mode as a preferential model turn pattern to the bulb turn mode, unless insufficient space exists between the interior boundary and the border to execute the alternate pass mode.

18. The method according to claim 14 further comprising:
allowing an operator operating the vehicle in the work area to dynamically select a turn mode corresponding to the model turn pattern from an alternate pass mode, a row skipping mode, and a bulb turn mode.

19. The method according to claim 18 further comprising:
allowing the operator to dynamically select the turn mode up to a minimum time duration or a minimum distance from approaching the interior boundary.

20. The method according to claim 14 further comprising:
allowing an operator to shift a start point or an end point of the turn in the work area by an increment or a decrement to compensate for at least one of a field condition, a curve, a discontinuity, a jog, an obstacle, a variation or an irregularity in at least one of the border or the interior boundary.

21. The method according to claim 20 further comprising:
limiting the increment or decrement by a spatial shift or temporal shift based on an impassable boundary beyond the boundary to avoid the vehicle or the implement traversing the impassible boundary.

22. The method according to claim 14 further comprising:
adjusting at least one of a starting point and an end point of the raw turn dynamically in the work area by an increment or a decrement based on a previous execution of a raw turn to align the end point with the interior boundary.

23. The method according to claim 14 further comprising:
alerting an operator via a user interface prior to executing the compensated turn.

24. A method for controlling a vehicle, the method comprising:
establishing a boundary of a work area;
determining a position of the vehicle via a location determining receiver;
planning a raw turn of the vehicle to be executed in accordance with a model turn pattern when the determined position traverses the boundary; and adjusting the raw turn of the vehicle to a compensated turn such that an implement coupled to the vehicle follows an implement path that substantially tracks the model turn pattern;

where the implement model is evaluated to determine whether, or not, a raw turn is executable and capable of execution without traversing a geographic area greater than a specified area allocated for the raw turn; and selecting an alternative type of turn when an initial selection is unexecutable within the specified area.

* * * * *